United States Patent [19]
Doell

[11] Patent Number: 6,152,825
[45] Date of Patent: Nov. 28, 2000

[54] PRE-ASSEMBLED UNIT FOR AUTOMOTIVE VEHICLES

[75] Inventor: Andreas Doell, Frankfurt, Germany

[73] Assignee: Continental Teves AG & Co. oHG, Germany

[21] Appl. No.: 09/167,339

[22] Filed: Oct. 7, 1998

[30] Foreign Application Priority Data

Oct. 10, 1997 [DE] Germany .......................... 197 44 870

[51] Int. Cl.[7] .................................. F16D 3/22
[52] U.S. Cl. .................. 464/140; 464/178; 464/906; 74/607; 301/105.1; 384/544
[58] Field of Search ............... 74/607; 464/140, 464/178, 901, 906; 188/18 A, 18 XL; 301/105.1, 124.1, 126; 384/537, 539, 544, 903

[56] References Cited

U.S. PATENT DOCUMENTS

| | | | |
|---|---|---|---|
| 4,249,395 | 2/1981 | Krude et al. | 464/906 |
| 4,300,651 | 11/1981 | Krude | 464/140 |
| 4,325,232 | 4/1982 | Girguis | 464/906 |
| 4,504,099 | 3/1985 | Miki et al. | 384/544 |
| 4,723,851 | 2/1988 | Troster et al. | 384/544 |
| 4,765,688 | 8/1988 | Hofmann et al. | 464/178 |
| 4,869,556 | 9/1989 | Gees | 301/126 |
| 5,052,979 | 10/1991 | Welschof et al. | 464/140 |
| 5,156,571 | 10/1992 | Kapaan et al. | 464/906 |
| 5,549,514 | 8/1996 | Welschof | 464/906 |
| 5,725,285 | 3/1998 | Niebling et al. | 384/544 |
| 5,795,233 | 8/1998 | Eschbach et al. | 464/906 |
| 5,853,250 | 12/1998 | Krude et al. | 464/178 |

FOREIGN PATENT DOCUMENTS

| | | |
|---|---|---|
| 4317606 | 1/1965 | Germany . |
| 3017757 | 11/1981 | Germany . |
| 3430067 | 4/1986 | Germany . |
| 3536437 | 4/1987 | Germany . |
| 3703252 | 10/1987 | Germany . |
| 3618139 | 12/1987 | Germany . |
| 4230639 | 10/1993 | Germany . |
| 4023020 | 8/1994 | Germany . |
| 4436789 | 5/1995 | Germany . |
| 19547981 | 7/1996 | Germany . |
| 19613441 | 10/1997 | Germany . |
| 8-200384 | 8/1996 | Japan . |
| 2165921 | 4/1986 | United Kingdom ............. 464/140 |

OTHER PUBLICATIONS

Search Report of the German Patent Office Application 19744870.4.

Primary Examiner—David A. Bucci
Assistant Examiner—Chong H. Kim
Attorney, Agent, or Firm—Rader, Fishman & Grauer PLLC

[57] ABSTRACT

A pre-assembled structural unit for driven axles of automotive vehicles, comprising a wheel flange (1), a brake disc (2), a wheel bearing (3), and a synchronizing joint including an inner part (5), an outer part (6), and an anti-friction bearing (7), can be mounted in a carrier unit (4) provided on the vehicle side.

The structural unit provides that the inner part (5) of the synchronizing joint is integrally formed with a shaft journal (5*a*) which can be connected to the end of a driving shaft (8) in a non-rotating way.

Hence, the pre-assembly interface hitherto located in the synchronizing joint is shifted toward the driving shaft so that the synchronizing joint with the sealing sleeve (10) completely mounted results in the pre-assembled unit, thereby substantially simplifying the final assembly.

3 Claims, 1 Drawing Sheet

PRE-ASSEMBLED UNIT FOR AUTOMOTIVE VEHICLES

BACKGROUND OF THE INVENTION

The present invention relates to a pre-assembled unit for driven axles of automotive vehicles, comprising a wheel flange, a brake disc, a wheel bearing and a synchronizing joint with an inner part, an outer part and an anti-friction bearing, the unit being adapted to be inserted into a carrier component of the automotive vehicle.

Car manufacturers are anxious to minimize the manufacturing efforts involved with the final assembly, i.e. to widely use as many pre-assembled units as possible, shifting manufacturing efforts, to the extent possible, to suppliers. Suppliers will benefit from this development in two respects. On the one hand, the increased assembly efforts incurred by them secure a higher utilization rate of their capacity and, on the other hand, their own product parts largely can be assembled in their own plant, enabling enhanced control and clearly defining the limits of liability. In this connection, a precise definition of the assembly interfaces is required for a clear limitation of liability.

In pre-assembled units of the afore-mentioned type, the assembly interface mostly is in the synchronizing joint via which the driving performance is transmitted from a driving shaft to the driven wheels. The pre-assembled unit comprises the wheel flange, the brake disc secured thereto, the wheel bearing and the outer part of the synchronizing joint in communication with the wheel hub. The said unit, during assembly, is inserted into the carrier component on the vehicle side, with the outer part of the synchronizing joint, via the anti-friction bearing, being at the same time in communication with the inner part of the synchronizing joint, which inner part, in turn, is pre-assembled on the vehicle side. It is readily apparent that this assembling step involves great efforts and requires substantial skill because two anti-friction fits are involved the precise dimensional coordination of which is of a substantial significance for the smooth operation of the unit during operation of the automotive vehicle.

Conventional pre-assembled units of the afore-mentioned type having a mounting interface in the synchronizing joint involve the disadvantage that the sleeve required for sealing the synchronizing joint can only be mounted at the end of the assembling operation which in view of the tight space conditions, frequently, is not easy. But substantial care is required because the life of the synchronizing joint to a high degree is dependent on the precisely mounted sealing sleeve.

In view of the afore-mentioned defects involved with preassembled units of the afore-described type it is the object of the invention to so improve such units that assembly thereof is substantially simplified, rendering available a unit better closed in itself and not involving any problems in handling the final assembly.

SUMMARY OF THE INVENTION

To solve this problem, it is suggested that in the pre-assembled unit of the afore-described type the inner part of the synchronizing joint is integrally formed with a shaft journal which can be connected to the end of a driving shaft in a non-rotating way.

The consideration underlying the invention is to displace the assembly interface away from the synchronizing joint in order to enable the latter to be completely pre-assembled together with the sealing sleeve so that during the final assembly only a connection between shaft journal and driving shaft is required, except for assembly into the carrier unit.

It is particularly advantageous to design the shaft journal in the form of a hollow cylinder with a serration to enable it to be simply plugged onto the correspondingly designed end of the driving shaft. The required sealing sleeve can be secured in a simple way, on the one hand, to the shaft journal of the inner part and, on the other hand, to the outer part of the synchronizing joint.

Further details and advantageous embodiments of the invention will now be described in greater detail with reference to the drawings.

DETAILED DESCRIPTION OF THE DRAWINGS

Figure 1:
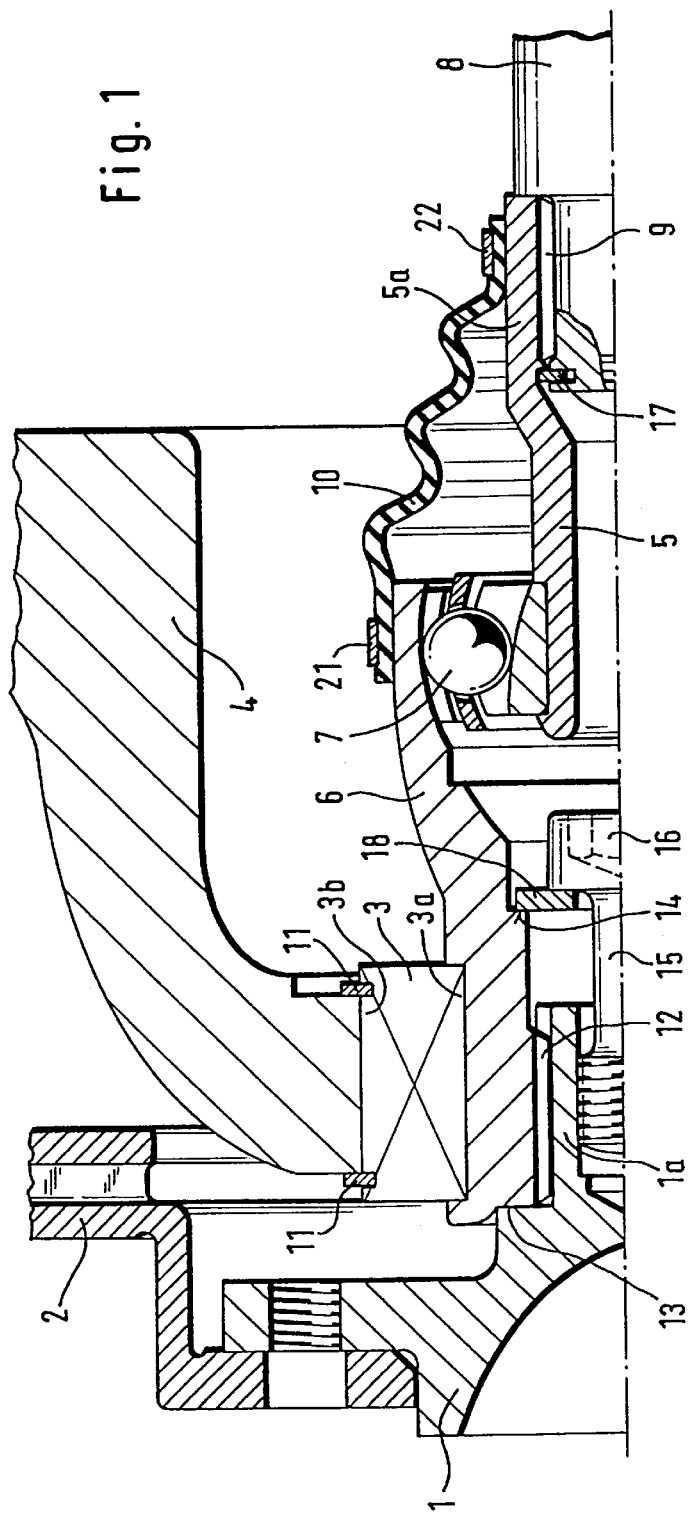
FIG. 1 shows a longitudinal section of the upper half of a first embodiment of the unit according to the invention.

In the embodiment according to FIG. 1, the pre-assembly unit is shown in mounted condition, i.e. on the one hand disposed within the carrier unit 4 of the vehicle side and, on the other hand, in communication with the end of a driving shaft 8 on the vehicle side. The assembly in the carrier unit 4, which can be a steering knuckle, in known manner is through forcing the outer ring 3b of the wheel bearing 3 into the carrier unit, and through axial fixation by means of Truarc locking rings 11. The communication with the driving shaft is designed as a simple plug-connection with serration 9, with the axial fixation being effected through a retainer ring 17 which in the event of a required disassembly is compressible via an adjusted ramp within the shaft journal 5a of the inner part 5 of the synchronizing joint.

Inner part 5 and outer part 6 of the synchronizing joint inclusive of the anti-friction bearing 7 are completely assembled and externally sealed by the sealing sleeve 10 equally already mounted. The latter is externally fixed, as is common practice, by band-shaped clamping elements 21, 22 on shaft journals 5a and on the outer part 6, it being possible also in this respect to additionally employ standard axial mounting means.

The inner ring 3a of the wheel bearing 3 is forced onto a mating face of the outer part 6 and is axially fixed by rolling rivets. The brake disc 2, in usual manner, is connected to the wheel hub 1 requiring only a relative fixation of the two components suitable for the assembly because the driving and braking forces are transmitted via the fixing means securing the wheel rim to the wheel flange.

The wheel flange 1 with a cylindrical extension 1a engages the outer part 6 of the synchronizing bearing, with conforming serrations 12 being provided to transmit the torque. Moreover, wheel flange 1 and outer part 6 of the synchronizing bearing are axially clamped by means of an expansion nut 15 and a disc 18 via stop faces 13,14, with the expansion nut 15 engaging a screw thread of the cylindrical extension. The head 16 of the expansion nut 15 in this embodiment is arranged on the driving side, i.e. inwardly.

Figure 2:
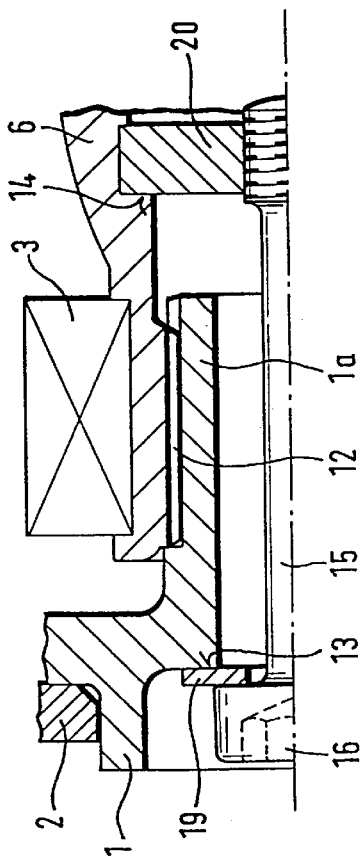
FIG. 2 shows a partial longitudinal section of a second embodiment of the invention.

According to the embodiment of FIG. 2 it is provided that the head 16 of the expansion nut 15 is arranged on the wheel side, i.e. outwardly. It is supported via a ring 19 on wheel flange 1 to which is secured the brake disc 2 as it is in the first embodiment. The wheel bearing 3, again, is disposed on a mating face of the outer part 6 of the synchronizing joint and is axially fixed by roll rivets. The extension 1*a* of the wheel flange 1 and of the outer part 6, again, have a conforming serration 12. Formed on the wheel flange 1 and on the outer part 6 of the synchronizing joint are, again, stop faces 13,14 on which are supported the disc 19 and the threaded disc 20. Via disc 19 and threaded disc 20 and via stop faces 13 and 14, respectively, wheel hub 1 and outer part 6 of the synchronizing joint are axially clamped by means of the expansion nut 15. All other components of the embodiment according to FIG. 2 can be designed as in FIG. 1 or can be of an equivalent configuration.

What is claimed is:

1. A pre-assembled structural unit for driven axles of automotive vehicles comprising a wheel flange, a brake disc, a wheel bearing with an inner and an outer ring, and a synchronizing joint including an inner part, an outer part and an anti-friction bearing the unit being insertable in a carrier component of the automotive vehicle, and the inner part of the synchronizing joint being integrally formed with a shaft journal which is connectable to the end of a driving shaft in a no-rotating way wherein the inner ring of the wheel bearing is supported on the outer part of the synchronizing joint, wherein the inner ring of the wheel bearing is secured by forcing it onto the outer part of the synchronizing joint and by roll-riveting a wheel-sided end of the outer part of the synchronizing joint.

2. A structural unit according to claim 1, wherein the outer ring of the wheel bearing fits in a carrier unit and is axially fixable.

3. A structural unit according to claim 2, wherein the outer ring of the wheel bearing can be axially fixed in the carrier unit by means of locking rings.

* * * * *